3,239,420
GELATIN COMPOSITION
Leon Gonshery, Philadelphia, and Tsugio Hamada, Perkasie, Pa., assignors to Vitamix Pharmaceuticals, Inc., Philadelphia, Pa., a corporation of Pennsylvania
No Drawing. Filed Oct. 11, 1962, Ser. No. 229,975
6 Claims. (Cl. 167—83)

This invention is directed to a gelatin composition and more particularly to a gelatin composition which may be used as the main component of soft-shell gelatin capsules.

Gelatin is widely used for the treatment of brittle fingernails. In such treatments, the recommended dosage of the gelatin is generally of the order of about 7 to 7.5 grams per day. It has proven most desirable to render such gelatin dosage available in the form of soft-shell gelatin capsules, so that the same may be carried about in the pocket or purse of the user.

However, gelatin is a most difficult material to load into soft-shell gelatin capsules. Thus, up until now there has not been available a gelatin mass which will readily flow so as to permit it to be loaded into soft-gelatin capsulating machines. Furthermore, attempts to render gelatin into a condition whereby it would readily flow through the use of solvents have led to severe difficulties due to the failure of the gelatin to remain in suspension. Water may not be used as a carrier for gelatin due to the tendency of the gelatin to swell and undergo water imbibition. The use of non-aqueous media for the gelatin is likewise unsatisfactory because of the pronounced tendency of the gelatin to settle out, and not to flow.

Attempts have been made to add suspending agents, such as the finely divided silica designated as Cab-O-Sil, but this has proved to be unsuccessful because of the pronounced tendency of the Cab-O-Sil to render processing of gelatin mass with soft-shell encapsulating equipment exceedingly difficult, since the suspended particles of gelatin prevents proper sealing of the seams of the soft-shell of the capsule as it is manufactured.

Inasmuch as there is a practical limit to gelatin capsules which may be readily swallowed, until the advent of the present invention it has not proven to be commercially feasible to furnish gelatin in capsule form for the routine treatment of brittle fingernails and the like.

This invention has as an object the provision of a novel gelatin composition.

This invention has as another object the provision of a gelatin composition which is free flowing, and which may be readily processed using soft-gelatin shell encapsulating equipment.

Other objects will appear hereinafter.

These and other objects are accomplished by the composition of the present invention in which the gelatin is used in the form of collagen hydrolysate. A wide variety of collagen hydrolysates may be utilized, such as collagen hydrolysates containing between about 20 weight percent water up to about 50 weight percent water. For the purposes of illustrating the present invention, the weight percentage range of the collagen hydrolysate in the composition of our invention is between 70 weight percent of collagen hydrolysates and 30 weight percent of water.

The gelatin composition of our invention also includes a sufficient amount of a liquid non-toxic hygroscopic agent to render the collagen hydrolysate free flowing, and to prevent it from hardening. We have found that a number of non-toxic hygroscopic agents are suitable for this purpose, namely polyethylene glycol (preferably of a molecular weight of the order of about 200 to about 500), concentrated aqueous sorbitol solutions, and glycerine. The exact amount of the hygroscopic agent in any given composition may vary dependent upon the agent and the nature and concentration of the collagen hydrolysate in the mixture, but the same may be determined by routine testing. In the case of polyethylene glycol of a molecular weight of about 400, we have determined that a weight percentage range of between about 7 to about 15 weight percent is most efficacious.

The gelatin composition of the present invention preferably includes minor amounts of preservatives, such as those conventionally used in dietary supplements, such as sodium benzoate. In addition, it is preferred to have an edible oil in the composition, such as safflower oil, olive oil, corn oil, peanut oil, sesame oil, sweet almond oil, sweet almond oil, soy bean oil, etc. The weight percentage range of the edible oil is generally below 2 weight percent, but even in these minor concentrations, the edible oil may substantially aid in the flowing of the gelatin composition.

A surface active agent which is safe for use in food supplements should also be present in the composition. A wide variety of suitable surface active agents are commercially available including a large number of the Tweens and Spans sold by the Atlas Powder Company of Wilmington, Delaware. For example, Tween 80 which is a sorbitan monooleate polyoxyalkylene derivative may be used.

The gelatin composition of the present invention is loaded into soft-shell gelatin capsules. The composition of such gelatin capsule shells forms no part of the present invention. However, a suitable gelatin capsule shell may be formed of between 40 to 50 weight percent of gelatin, 30 to 40 weight percent of water, and 20 to 30 weight percent of glycerine, plus a minor amount of a suitable preservative.

The gelatin composition of the present invention is preferably blended at an elevated temperature, generally within the temperature range of between about 160° F. to 170° F. under agitation. Each of the components of the mixture may be raised to this temperature, and the mixture blended using high speed stirring to achieve a complete emulsion. We have found that the flowability of the mass may be improved if after the complete emulsion is obtained, the vessel containing the emulsion is placed under a reasonably high vacuum, such as 29 inches mercury or so, and the vacuum maintained for an extended period, such as about six hours while the temperature is gradually reduced, but is maintained at all times at about 130° F.

When the vacuum is concluded, the mixture may be cooled to a temperature of between 80° F. and 90° F., preferably about 85° F. At this temperature the gelatin composition may be used in the soft-shell capsulating machine. The resultant mixture will be free flowing, and will constitute a stable emulsion.

It is, of course, to be understood that the present invention includes gelatin compositions in which minor amounts of suitable pigmenting agents, such as titanium dioxide, and/or flavoring agents, such as vanillin, may be present.

The use of the gelatin compositions of the present invention enables masses of gelatin in excess of one gram to be loaded into a swallowable soft-shell gelatin capsule.

In order to illustrate the gelatin compositions of the present invention, there is presented herewith the following examples. It is to be understood that the following examples are by way of illustration, and not by way of limitation. Within the parameters set forth above, one having ordinary skill in the art may vary the nature and concentration of the components in order to produce mixtures having satisfactory though somewhat modified properties.

Example I 86 weight percent of a collagen hydrolysate containing 70 weight percent of collagen hydrolysate and 30 weight percent of water was added to a vacuum type stainless steel jacketed vessel. Such collagen hydrolysate is commercially available from the Atlantic Gelatin Company of Woburn, Massachusetts. It was derived solely from the aqueous processing of the white fiber of the connective tissues of vertebrates derived from skin, bones, and tendons. No acid treatment was incorporated into the preparation of the collagen hydrolysate.

The temperature of the collagen hydrolysate was gradually raised to the temperature range of 160° F. to 170° F. In a separate vessel, 11.6 weight percent of a liquid polyethylene glycol having a molecular weight of about 400 was blended with about 1.4 weight percent of a solid polyethylene glycol having a molecular weight of about 4000. The temperature of the mixture was gradually raised to about 160° F. to 170° F., and a solution of the higher molecular weight polyethylene glycol was achieved. Then about 0.1 weight percent of Tween 80 was added to the mixture followed by about 0.9 weight percent of olive oil.

The agitation was continued until a homogeneous solution was obtained. This solution was then added to the heated collagen hydrolysate, and agitation was continued with the combined mixture for a sufficient period to achieve a complete emulsion.

The vessel containing the mixture was then sealed and subjected to a vacuum of 29 inches of mercury. The vacuum was maintained for six hours, and the temperature at all times was kept between 130° F. and 160° F.

After six hours, the vacuum was removed, and the emulsion cooled to 85° F. It was then processed using soft-shell encapsulating equipment into soft-shell gelatin capsules in dosages containing one gram of the equivalent of commercial gelatin.

Example II

The process of Example I was repeated except that in place of the 86 weight percent of collagen hydrolysate containing 70 weight percent of collagen hydrolysate, there was substituted 84 weight percent of a collagen hydrolysate containing 80 weight percent of collagen hydrolysate and 20 weight percent of water, and in place of the 11.6 weight percent of the polyethylene glycol having a molecular weight of about 400 there was substituted 13.5 weight percent of such polyethylene glycol.

Example III

The process of Example I was repeated except that in place of the 11.6 weight percent of polyethylene glycol having a molecular weight of 400 and the 1.4 weight percent of polyethylene glycol having a molecular weight of 4000 there was substituted 13 weight percent of a sorbitol solution having a minimal quantity of water (sufficient to prevent the sorbitol from separating out).

Example IV

The process of Example I was repeated except that in place of the 11.6 weight percent of polyethylene glycol having a molecular weight of 400 and the 1.4 weight percent of polyethylene glycol having a molecular weight of 4000 there was substituted 13 weight percent of glycerine, and in place of the 0.9 weight percent of olive oil there was substituted 0.9 weight percent of safflower oil.

Example V

The process of Example I was repeated except that in place of the mixture of polyethylene glycol having a molecular weight of 400 and polyethylene glycol having a molecular weight of 4000, there was substituted a polyethylene glycol having a molecular weight of 300.

Example VI

The process of Example I was repeated except that in place of the 86 weight percent of collagen hydrolysate having 70 weight percent of collagen hydrolysate and 30 weight percent of water, there was substituted a collagen hydrolysate having 60 weight percent of collagen hydrolysate and 40 weight percent of water.

The present invention may be embodied in other specific forms without departing from the spirit or essential attributes thereof and, accordingly, reference should be made to the appended claims, rather than to the foregoing specification as indicating the scope of the present invention.

We claim:

1. A soft-shell gelatin capsule having within it a mixture consisting essentially of a homogeneous mixture of a collagen hydrolysate containing between about 26.25 weight percent collagen hydrolysate up to about 50.40 weight percent collagen hydrolysate, water, and a sufficient amount of a liquid non-toxic hygroscopic agent to render the collagen hydrolysate free flowing, and to prevent it from hardening.

2. A soft-shell gelatin capsule in accordance with claim 1 in which the hygroscopic agent is polyethylene glycol.

3. A soft-shell gelatin capsule in accordance with claim 2 in which the polyethylene glycol has a molecular weight of the order of about 200 to about 500.

4. A soft-shell gelatin capsule in accordance with claim 1 in which the hygroscopic agent is a concentrated aqueous sorbitol solution.

5. A soft-shell gelatin capsule in accordance with claim 1 in which the hygroscopic agent is glycerine.

6. A soft-shell gelatin capsule in accordance with claim 1 which includes an edible oil to the extent of below 2 weight percent, but in a sufficient amount to aid in the flowing of a gelatin composition.

References Cited by the Examiner

UNITED STATES PATENTS

| 2,870,062 | 1/1959 | Stanley et al. | 167—83 |
| 2,973,301 | 2/1961 | Klotz | 167—83 |
| 3,024,167 | 3/1962 | Damaskas | 167—65 |
| 3,028,308 | 4/1962 | Zambito et al. | 167—82 |
| 3,073,702 | 1/1963 | Keil et al. | 260—123.7 X |

FOREIGN PATENTS

| 886,553 | 1/1962 | Great Britain. |

OTHER REFERENCES

Discount Drug ad, Aug. 11, 1958 (1 p.).

Dispensatory of the U.S., J. B. Lippincott Co., Philadelphia, Pa., 1955, 25th ed., Part 1, pp. 598–600, 114–1141.

JULIAN S. LEVITT, *Primary Examiner.*

FRANK CACCIAPAGLIA, JR., *Examiner.*